United States Patent [19]

Schoettle et al.

[11] Patent Number: 4,687,157
[45] Date of Patent: Aug. 18, 1987

[54] TAPE CASSETTE, IN PARTICULAR A VIDEO CASSETTE, AND A PRESSURE SPRING FOR THIS

[75] Inventors: Klaus Schoettle, Heidelberg; Artur Buhk, Erpolzheim; Eugen Kamm, Appenweier; Heinz Berger, Kehl; Dieter Gaiser, Rheinau, all of Fed. Rep. of Germany

[73] Assignee: BASF Aktiengesellschaft, Ludwigshafen, Fed. Rep. of Germany

[21] Appl. No.: 810,203

[22] Filed: Dec. 18, 1985

[30] Foreign Application Priority Data

Dec. 21, 1984 [DE] Fed. Rep. of Germany ... 8437534[U]

[51] Int. Cl.$^4$ .......................... G03B 1/04; G11B 15/32
[52] U.S. Cl. ...................................... 242/199; 360/132
[58] Field of Search ............................... 242/197–200; 360/93, 94, 96.1, 132

[56] References Cited

U.S. PATENT DOCUMENTS

| 4,187,998 | 2/1980 | Okamura et al. | 242/199 |
| 4,368,860 | 1/1983 | Goto | 242/199 |
| 4,428,547 | 1/1984 | Gotoh | 242/199 |
| 4,458,858 | 7/1984 | Nelson | 242/199 |
| 4,500,050 | 2/1985 | Oishi et al. | 242/198 |
| 4,553,717 | 11/1985 | Takagi | 242/199 X |

Primary Examiner—Stuart S. Levy
Assistant Examiner—David Werner
Attorney, Agent, or Firm—Keil & Weinkauf

[57] ABSTRACT

A tape cassette has a housing, at least one tape reel, a front wall and a pressure spring for exerting a spring force on the tape reel(s). The pressure spring is held, e.g. jammed or wedged, between the front wall and a connecting pin connecting parts of the housing together by means of anchoring means forming part of the spring itself.

7 Claims, 3 Drawing Figures

TAPE CASSETTE, IN PARTICULAR A VIDEO CASSETTE, AND A PRESSURE SPRING FOR THIS

BACKGROUND OF THE INVENTION

1. Field of the Invention

This invention relates to a tape cassette, in particular a video tape cassette, of the kind having a housing, at least one tape reel, a front wall and a pressure spring which exerts a spring force on said at least one tape reel in the direction of a defined operating position, the housing comprising at least two housing parts which are connected to one another by connecting means. The invention also relates to a pressure spring for such a tape cassette.

2. Description of Related Art

In all commercially available video cassettes of the VHS and Beta video systems, as well as in the comparatively new 8 mm video cassette, coplanar reels are pressed toward the lower half of the housing by curved springs which are fastened inside the upper half of the housing and have been punched out of spring sheet material. Hence, when such a cassette is placed in the appropriate playback apparatus, the reels lie evenly on the hub holders of the apparatus and run smoothly when the tape is played back. All such reel pressure springs have the same function, but their sizes and their spring powers may differ in different cassettes depending on the cassette size, the reel size and the reel spacing.

Each pressure spring is usually manufactured by punching it out of spring steel strip in an advantageous manner to save material and in a rapid punching sequence.

German Utility Model No. 8,418,178 describes a pressure spring for, for example, VHS cassettes, which can be suspended from a window of the cassette housing by means of an integral hook, the pressure spring being attached in such a manner that it cannot be lost, e.g. during manufacture. The disadvantage with this known pressure spring is that the cassette window is inevitably partially obscured. German Laid-Open Patent Application DOS No. 3,329,890 discloses a plate spring for a video cassette which is not welded to the upper housing part but which is held in position by means of a cylindrical pin which is located on the lower cassette part and which projects into a locating hole in the upper housing part when the cassette is closed. However, before the cassette is assembled and when the housing is open, the spring lies loosely in the upper housing part and can slip or fall out, inevitably resulting in problems during manufacture or operation. Other disadvantages of this known pressure spring are that the dimensions of the housing parts have to be matched very precisely with one another, which presents problems and is expensive where large numbers are involved, and that the sprng pushes the housing parts apart as a result of its spring action, so that the cassette may open up after a certain time due to the plastic yielding.

SUMMARY OF THE INVENTION

It is an object of the present invention to provide a tape cassette in which the pressure spring is simple and economical to manufacture and can be mounted simply and reliably.

It has been found that this object is achieved by a tape cassette of the kind referred to if the pressure spring is held between the front wall and a connecting pin of the connecting means by anchoring means forming part of the spring itself.

The spring can thus advantageously be inserted into the still open cassette housing in a reliable manner and without additional welding operations or other additional fastening means, and is secured against falling out.

Advantageously, the anchoring means comprises a bent-over edge and a cutout, e.g. a V-shaped notch, which is matched to the contour of the connecting pin and effects anchoring.

The spring can thus easily be manufactured by punching and can be inserted simply and effectively, after which it can be separated from the housing only with force.

Conveniently the pressure spring is a two-armed spring which is symmetrical with respect to its transverse axis, possesses the bent-over edge and the cutout in a middle part of the spring, and is fastened symmetrically wth respect to the transverse axis of the housing.

This simple method of fastening the spring by jamming it in position also makes it particularly suitable for small cassettes in which conventional assembly operations, such as welding etc., present problems.

According to another aspect of the invention there is provided a pressure spring for a tape cassette having a housing, at least one tape reel, a front wall and at least one connecting pin for the housing parts, the pressure spring being designed to exert a spring force on said at least one tape reel in the direction of a defined operating position, wherein the spring possesses at least one bent-over edge and a cutout for anchoring the spring between the front wall and the at least one connecting pin.

BRIEF DESCRIPTION OF THE DRAWINGS

An embodiment of the invention will now be described, by way of example, with reference to the accompanying drawing, in which.

DESCRIPTION OF THE PREFERRED EMBODIMENT

Figure 1:
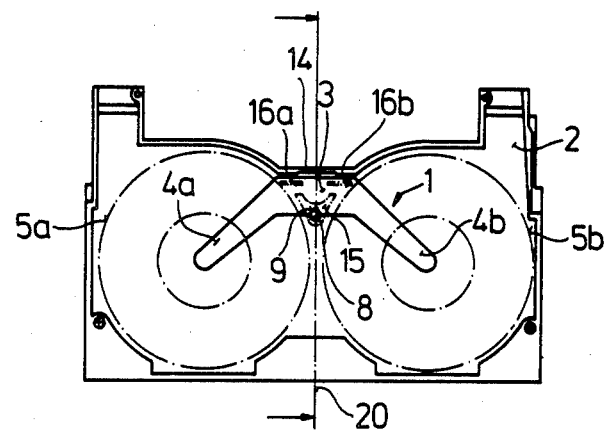
FIG. 1 is a plan of the inside of the upper part of a tape cassette according to the invention with a pressure spring therein.
Figure 3:
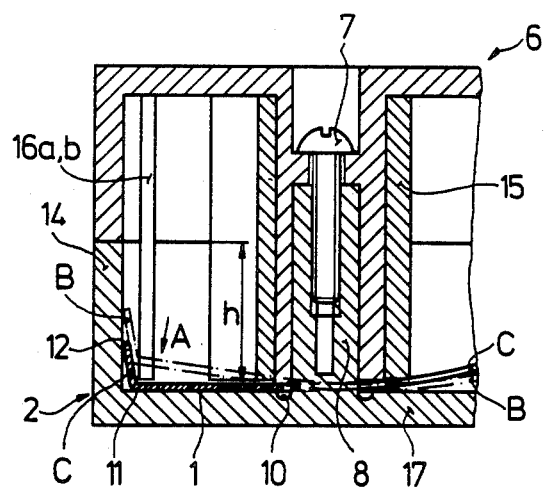
FIG. 3 is a section through the transverse axis of the cassette, taken on the arrowed line in FIG. 1, showing the position of the spring in the tape cassette.

A tape cassette according to the invention is shown in FIGS. 1 and 3 and includes a pressure or plate spring 1, an upper housing part 2 and a lower housing part 6. The spring 1 possesses, in a conventional manner, a middle part 3, which lies outside the area of operation of tape reels 5a and 5b and which is symmetrical with respect to a transverse axis 20, and two spring arms 4a and 4b, the free end portions of which press the reels 5a and 5b toward the lower housing part 6.

The spring 1 possesses an edge bent over at an angle of about 100° and a V-shaped notch 9 which is opposite the center of the said edge. When the spring 1 is inserted into the upper housing part 2, the notch 9 of the spring 1 is placed on a connecting pin or screw pin 8, or more precisely so as to engage around the base of the screw pin 8 on the top wall 17 of the cassette (shown at the bottom of FIG. 3). The spring is then pressed from a position B in direction A to the final position C so that the spring 1 is wedged or jammed in position. The bent-over edge B along the bending edge 11 makes contact under spring force with, advantageously, the upper front wall of the housing part 2, and the lower edge 12, which advantageously still possesses the burr from punching and therefore has a relatively sharp edge, cuts to a slight extent into the front wall 14 and thus becomes clamped or anchored against the insertion apparatus. The burr from punching is generally only a few hundredths of a millimeter. The cassette housing 2, 6 is generally produced from a tough plastic such as ABS or high impact polystyrene. Consequently, there is no abrasion when the spring 1 is inserted, but the said burr is sufficient for gripping and fixing the spring 1. The bent-over edge 13 is preferably bent with respect to the plane of the middle part 3 of the spring 1 through an angle of from 115° to 95° (>90°). The height of the bent-over edge 13 is not more than 90%, preferably from 20% to 50%, of the internal height h which is half the height of the front wall 14. In relation to the height 2 h of the front wall the height of the bent-over edge should be not more than 50% and preferably from 10% to 30% of the height h.

The notch 9, too, is provided with a burr when the spring 1 is produced by a conventional punching method.

To prevent the burr of the notch 9 from scraping the top wall 17 of the upper housing part 2 during spring insertion, the top wall 17 is provided with an annular depression 10 around the screw pin 8. This also results in the entire area of the middle part 3 of spring 1 resting on the top wall 17.

Tests have shown that the inserted spring 1 according to the invention is so firmly anchored in the upper housing part 2 that it can be removed only forcibly with a tool, so that no further securing means are required. For additional security, however, walls 15 may be provided around the screw connection 7, and walls 16a and 16b provided in lower housing part 6, these walls extending to about the level of the spring 1 in the upper housing part. If, in an exceptional case, the spring 1 should become detached from its anchorage in the upper housing part, it can support itself on these walls 15 and 16 of the lower housing part 6. In this case, the screw 7 prevents the halves 2 and 6 of the housing from coming open as a result of the spring load.

Figure 2:
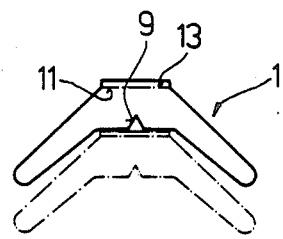
FIG. 2 shows the spring of the tape cassette of FIG. 1 but in its form when punched out.

FIG. 2 shows a form of the spring 1 which can be cut out or punched out with particularly little waste. Here, the notch 9 is approximately V-shaped, although other shapes, e.g. semi-circular, curved or rectangular, may also be chosen if the notch is able to lock adequately around the contour of the connecting pin 8. The material used for the spring 1 may be conventional spring steel sheet or plastic sheet possessing suitable properties.

In another embodiment of the invention (not shown) it is possible for the pressure spring 1 to be jammed or wedged between the front wall of the cassette and an internal housing part, e.g. an internal projection, formed on the top wall of the tape cassette. In this case the internal projection could be of similar external cross-section to the screw pin 8 but not serve as a screw pin. It is also possible in a further embodiment for the spring 1 to be wedged between an internal projection and a rear wall of the cassette.

We claim:

1. A tape cassette, in particular a video tape cassette, having a housing including rear-, front- and side-walls and enclosing two coplanar tape reels and a pressure spring for said tape reels, said pressure spring and said two tape reels being arranged symmetrically with respect to the transverse central plane of said housing, said housing having at least two parts connected together by a connecting means including a connecting pin lying in said transverse central plane, and said pressure spring having substantially the shape of a V formed by two arms joined to a central part, wherein on the pressure spring there are provided anchoring means comprising
   a bent-up edge portion extending from said central part and
   a cutout on the side of said central part opposite said bent-up edge portion,
   whereby, upon insertion of said spring into said housing, said spring is clamped between said front wall and said connecting pin, with said bent-up edge portion bearing against said front wall and said cutout bearing against said connecting pin.

2. A tape cassette according to claim 1, wherein the bent-up portion is inclined at an angle from 115° to 95° with respect to the plane of said spring.

3. A tape cassette according to claim 1, in which the bent-up edge portion has a dimension, perpendicular to its fold line, of not more than 50% of the internal height of said front wall.

4. A tape cassette according to claim 3, wherein said dimension is from 10% to 30% of said internal height of the front wall.

5. A pressure spring for a tape cassette having a housing with two parts, at least one tape reel, a front wall and at least one connecting pin for connecting the housing parts together, the pressure spring being designed to exert a spring force on said at least one tape reel in the direction of a defined operating position, wherein the spring has at least one bent-up edge portion cooperating with said front wall and, opposite thereto, a cutout cooperating with said connecting pin, for clamping the spring between the front wall and the connecting pin.

6. A pressure spring according to claim 15, having two arms which are symmetrical with respect to the transverse central plane of the spring and a central part on which the bent-up edge portion and the cutout are formed.

7. A tape cassette, in particular a video tape cassette, having a housing including rear-, front- and side-walls and enclosing two coplanar tape reels and a pressure spring for said tape reels, said pressure spring and said two tape reels being arranged symmetrically with respect to the transverse central plane of said housing, said housing having at least two parts connected together by a connecting pin lying in said transverse central plane, and said pressure spring having substantially the shape of a V formed by two arms jointed to a central part, wherein on the pressure spring there are provided anchoring means comprising
   a bent-up edge portion extending from said central part and
   a cutout on the side of said central part opposite said bent-up edge portion.
   whereby, upon insertion of said spring into said housing, said spring is clamped between one of said front and rear walls and said connecting pin, with said bent-up edge portion bearing against said one wall and said cutout bearing against said connecting pin.

* * * * *

UNITED STATES PATENT AND TRADEMARK OFFICE
CERTIFICATE OF CORRECTION

PATENT NO. : 4,687,157
DATED : Aug. 18, 1987
INVENTOR(S) : Schoettle et al.

It is certified that error appears in the above-identified patent and that said Letters Patent are hereby corrected as shown below:

Col. 4, line 20   after "bent-up" insert -- edge --

" . ",   " 40   "15" should be -- 5 --

Signed and Sealed this

Ninth Day of February, 1988

Attest:

Attesting Officer

DONALD J. QUIGG

Commissioner of Patents and Trademarks